United States Patent
LaPlace et al.

(10) Patent No.: US 6,595,739 B1
(45) Date of Patent: Jul. 22, 2003

(54) METHOD AND APPARATUS FOR STACKING SLICES OF FOOD PRODUCT

(75) Inventors: Christian LaPlace, Dollard des Ormeaux (CA); Bruno Omann, Beaconsfield (CA)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/894,544

(22) Filed: Jun. 28, 2001

(51) Int. Cl.[7] .............................................. B65G 57/04
(52) U.S. Cl. ................. 414/793; 414/791.1; 198/689.1; 271/307
(58) Field of Search ............................. 414/790.9, 791, 414/791.1, 793; 198/689.1; 271/287, 288, 298, 300, 307, 308, 196, 197

(56) References Cited

U.S. PATENT DOCUMENTS

| | | | |
|---|---|---|---|
| 2,083,211 A | 6/1937 | Alderfer | |
| 2,813,637 A | 11/1957 | Perry et al. | |
| 2,895,552 A | 7/1959 | Pomper et al. | |
| 3,027,817 A | 4/1962 | Loeffler | |
| 3,202,302 A | 8/1965 | Insolio | |
| 3,205,794 A | 9/1965 | Califano et al. | |
| 3,305,233 A | 2/1967 | Cody | |
| 3,395,915 A | 8/1968 | Clausen et al. | |
| 3,460,685 A | 8/1969 | Kirkhof | |
| 3,477,558 A | 11/1969 | Fleischauer | |
| 3,525,443 A | 8/1970 | Pomara, Jr. | |
| 3,542,570 A | 11/1970 | Bush et al. | |
| 3,592,329 A | 7/1971 | Fleischauer | |
| 3,592,334 A | * 7/1971 | Fleischauer | 198/629 |
| 3,608,895 A | * 9/1971 | Kalven | 198/457.03 |
| 3,698,708 A | 10/1972 | Brawn | |
| 3,717,249 A | 2/1973 | Faley | |
| 3,848,757 A | 11/1974 | Jordan | |
| 3,900,574 A | 8/1975 | Warwick | |
| 4,003,462 A | 1/1977 | Perrott | |
| 4,065,839 A | 1/1978 | Pointner | |
| 4,096,941 A | 6/1978 | Tokuno | |
| 4,256,214 A | * 3/1981 | Back, Jr. | 198/367 |
| 4,440,388 A | 4/1984 | Divoux et al. | |
| 4,500,243 A | 2/1985 | Ward, Jr. et al. | |
| 4,517,790 A | 5/1985 | Kreager | |
| 4,530,632 A | 7/1985 | Sela | |
| 4,620,826 A | 11/1986 | Rubio et al. | |
| 4,627,608 A | * 12/1986 | Harms | 271/197 |
| 4,786,046 A | 11/1988 | Freeman et al. | |
| 4,809,575 A | 3/1989 | Swanson | |
| 4,856,262 A | 8/1989 | Uithoven | |
| 4,905,843 A | 3/1990 | Holbert | |
| 5,114,307 A | * 5/1992 | Meli et al. | 198/689.1 |
| 5,340,100 A | * 8/1994 | Romanenko | 193/8 |
| 6,131,901 A | * 10/2000 | Hirohata | 271/188 |

FOREIGN PATENT DOCUMENTS

| | | |
|---|---|---|
| CA | 960238 | 12/1974 |
| CA | 2062291 | 9/1992 |
| CA | 2129668 | 9/1993 |
| CA | 2135377 | 10/1997 |
| GB | 888350 | 1/1962 |
| GB | 1445836 | 8/1976 |

* cited by examiner

Primary Examiner—Kathy Matecki
Assistant Examiner—Michael J. Kwon
(74) Attorney, Agent, or Firm—Fitch, Even, Tabin & Flannery

(57) ABSTRACT

A method and apparatus for stacking slices of food products such as wrapped cheese slices and the like at high speeds. The apparatus comprises a vacuum conveyor for supporting slices from above, and at least one transfer bridge for mechanically peeling the slices sequentially from the conveyor and directing them downward into one or more stacking locations. The transfer bridge preferably comprises a plurality of downwardly sloping surfaces disposed beside the belts. To assist the transfer bridge in separating the slices from the belts, and to control slice position after separation, fluid pressure is applied to the slices during and after separation from the belts.

37 Claims, 2 Drawing Sheets

METHOD AND APPARATUS FOR STACKING SLICES OF FOOD PRODUCT

BACKGROUND OF THE INVENTION

The invention relates to a method and apparatus for use in packaging slices of a food product such as cheese slices, and more particularly to a linear stacker for stacking such slices in a form, fill and seal operation in a high speed commercial packaging line.

In packaging cheese slices or other stacked, sliced food products, the stacking operation may be a critical point in that it may represent a limiting factor in terms of throughput rate. Thus, there is a continuing need for improvements to increase the speed of existing stacking operations.

To be commercially viable, a method and apparatus for stacking slices in a high speed commercial operation must be very reliable, due to the fact that any interruption of the stacking operation may result in significant losses of time and material. If the stacking operation is interrupted, upstream production of the slices may also need to be interrupted, and slices that have already been formed and wrapped may be wasted.

The method and apparatus described below are useful in high speed commercial operations such as a continuous "hot pack" line wherein individually wrapped cheese slices are formed, separated, and stacked, and an overwrap is then formed, filled, and sealed around the stack, in a continuous, in line operation. In this type of process, the cheese slice may comprise a slice of pasteurized process cheese, pasteurized process cheese food, pasteurized process cheese spread, or the like, hot filled into a continuous wrapper to form a ribbon which is separated into individual wrapped slices. The method and apparatus of the invention may also be useful with other foods, such as slices of meat or natural cheese.

SUMMARY OF THE INVENTION

The invention provides a method and apparatus for stacking slices of food products such as wrapped cheese slices and the like at high speeds with high reliability. The apparatus comprises a vacuum conveyor for supporting slices from above, and at least one transfer bridge for mechanically peeling the slices sequentially from the conveyor and directing them downward into one or more stacking locations. The transfer bridge preferably comprises a plurality of downwardly sloping surfaces disposed beside the belts. The conveyor preferably comprises at least two parallel conveyor belts, each having a series of perforations therein communicating with a vacuum source. The transfer bridge preferably includes downwardly sloping surfaces disposed between the belts as well as outside the belts and extending below the elevation of the belts.

The transfer bridge may act on each particular slice while a vacuum is also acting on the same slice. To assist the transfer bridge in accelerating the slices downward, away from the belts, and to control slice position after separation, fluid pressure may be applied to the slices during and/or after separation of the slices from the belts by activation of one or more fluid actuators. Fluid pressure is preferably applied by directing a gas such as air at selected locations on the slice at selected times. A plurality of jets or nozzles may be employed to direct pulses of air at the selected portions of the slice at the selected times. Air may be supplied through a manifold 56 disposed downstream of a control valve.

The transfer bridge tends to tilt or rotate the slice while the slice proceeds forward. To counter the rotation applied by the transfer bridge, more fluid pressure is applied by the nozzles to the trailing portion of the slice. The fluid pressure may act on the slice to control its orientation and urge it downward into a stacking location before and/or after it has lost contact with the belts and transfer bridge.

To enable the pulses of air to be timed precisely in relation to the linear travel of the slice, the slice position is preferably detected by an optical sensor, a mechanical switch, or other means for sensing when the slice reaches a predetermined trigger point, traveling at a known velocity, and the pulses of air are activated at a predetermined time interval after the slice is detected at the trigger point. This time interval preferably takes into account the reaction time of the fluid actuator. To further increase the reliability of the apparatus, additional logic may be incorporated into the stacker control system to detect any slices that may adhere together. To avoid any interruption of stacking, the transfer bridge may then be disabled with respect to these joined slices. This ensures that a pair of overlapping slices will be directed to the same stacking location. Otherwise, the pair of slices might be draped over the wall between the stacking locations.

The method and apparatus may employ two or more conveyors operating in parallel. Each conveyor may have two or more stacking locations, and two or more transfer bridges associated therewith. One or more of the transfer bridges may be retractable to permit slices to travel past the retracted transfer bridge on the belt to reach stacking locations downstream therefrom. Stacks produced at a particular stacking location may be combined with those produced at other stacking locations from the same or other conveyors. In the preferred embodiment, the apparatus may attain an operating speed between approximately 100 and 2500 slices/minute. To improve efficiency and speed, the mechanical motions of the apparatus and the activation times of the fluid actuators are preferably parameterized in the control system to coordinate operation of the transfer bridges and fluid pulses.

DETAILED DESCRIPTION OF PREFERRED EMBODIMENT

Figure 1:
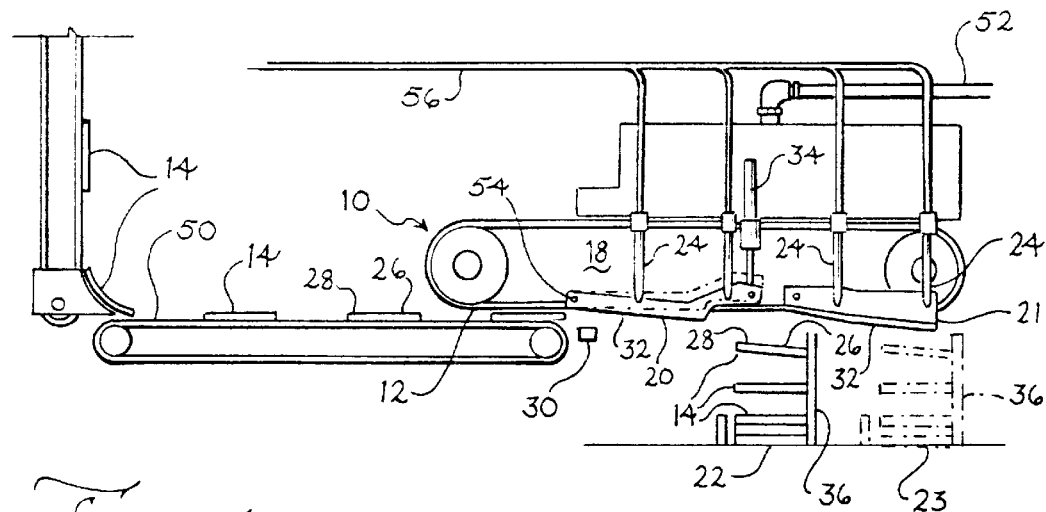
FIG. 1 is a schematic side elevation illustrating a method and apparatus in accordance with the invention.
Figure 2:
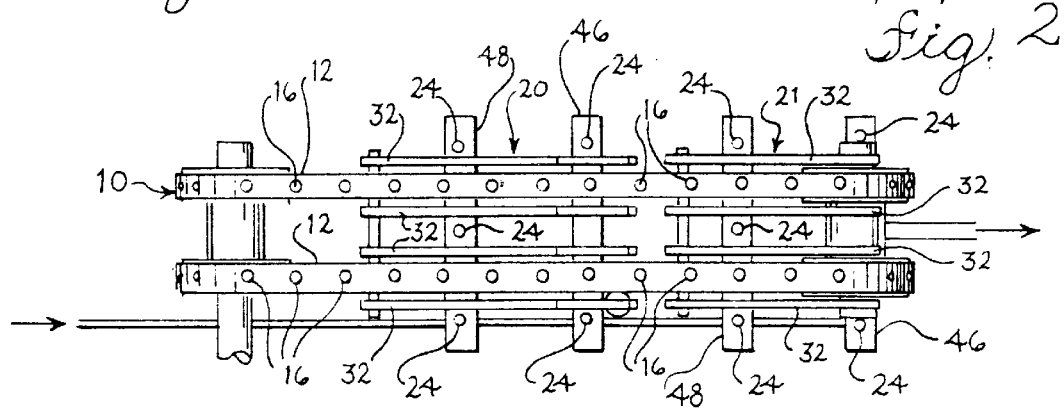
FIG. 2 is a schematic bottom plan view of the vacuum conveyor of FIG. 1, shown on an enlarged scale.
Figure 3:
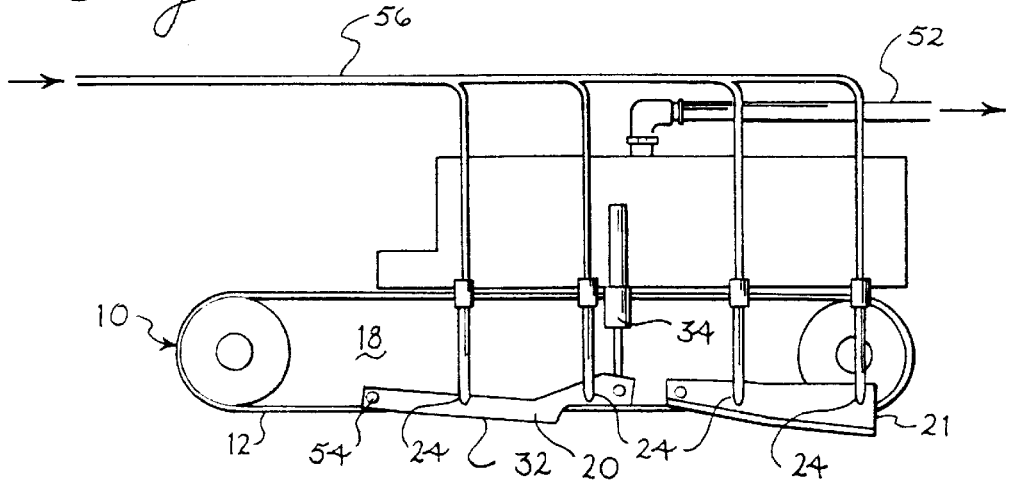
FIG. 3 is a schematic side elevation thereof.
Figure 4:
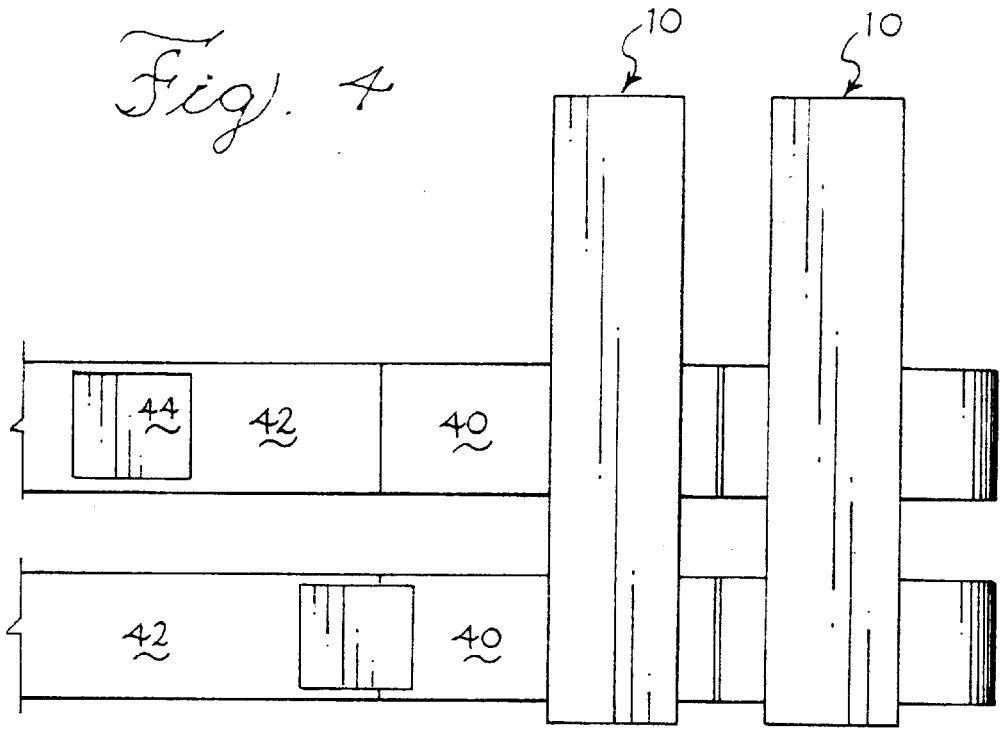
FIG. 4 is a schematic plan view of a stacking operation that includes the apparatus of FIG. 1.
Figure 5:
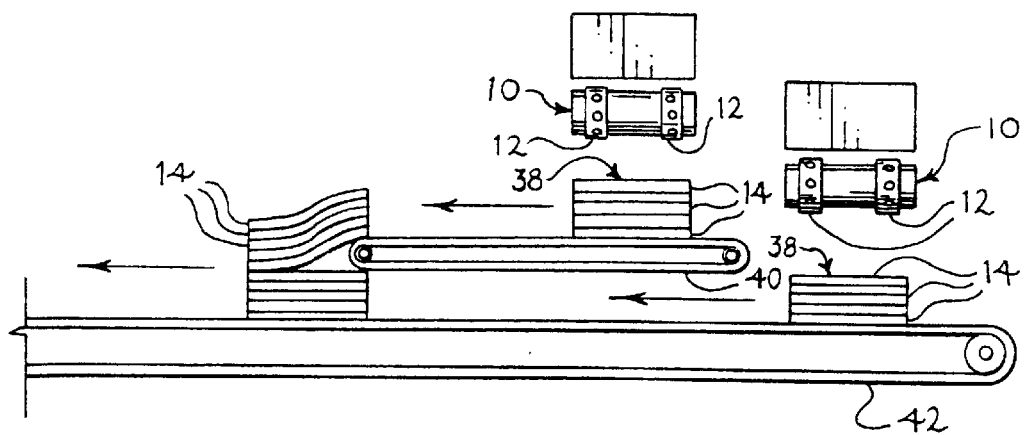
FIG. 5 is an end view thereof.

The invention is preferably embodied in a method and apparatus for stacking slices of food products such as wrapped cheese slices and the like at high speeds. The apparatus preferably includes a vacuum conveyor 10 having two or more vacuum belts 12 for supporting slices 14 from above to carry them to one or more stacking locations. In the illustrated embodiment, the conveyor comprises a pair of vacuum belts, each having a series of perforations 16 therein communicating with a vacuum chamber 18 through a perforated plate as the lower portion of the belt proceeds along the bottom of the conveyor. The vacuum chamber is connected to a vacuum pump by a conduit 52.

The slices are delivered to the vacuum conveyor by an infeed conveyor 50 having an upper surface spaced from the lower surface of the vacuum conveyor by a gap approximately equal to the slice thickness. The dimension of the gap may be adjusted to accommodate variations in slice thickness by a screw mechanism or other mechanism.

The apparatus further includes transfer bridges 20 and 21 for mechanically peeling the slices 14 sequentially from the conveyor 10 and directing them downward into respective stacking locations 22 and 23. Each transfer bridge includes a plurality of downwardly sloping surfaces 32 disposed beside the belts, preferably between the belts as well as outside the belts.

In the illustrated embodiment, each transfer bridge 20 or 21 acts on a particular slice to separate it from the belts 12 while an upward force is also acting on the same slice due to the vacuum. To assist the transfer bridge in separating the slices from the belts, and to control slice position after separation, fluid pressure is applied to the slices from above during and after separation from the belts. Fluid pressure is preferably applied by directing one or more pulses of a gas such as air at selected locations on the slice at selected times by activation of one or more fluid actuators, such as air valve(s). A plurality of nozzles 24 may be employed for this purpose.

In the preferred embodiment, to assist in displacing the slice 14 downward, away from the conveyor, pulses of air are applied to the slice as the transfer bridge 20 separates the slice from the belts 12. To counter the rotation applied by the transfer bridge 20 so that the slice 14 drops into its stacking location in a generally horizontal orientation, fluid pressure is applied by the nozzles 24 to the trailing portion 28 of the slice. Lower magnitude fluid pressure may also be applied to the leading portion 26 to increase downward acceleration of the slice. To this end, a first row 46 of nozzles is positioned to engage a leading portion of each slice, and a second row 48 engages a trailing portion, with the second row comprising more nozzles. In the illustrated embodiment, the second row 48 at each stacking location consists of a central nozzle between the belts, and a pair of nozzles outside the belts. The first row 46 consists of a pair of nozzles outside the belts. Each of the nozzles may provide a pulse of substantially the same duration and magnitude, or the nozzles may be operated independently. The fluid pressure assists the transfer bridge in accelerating each of the slices downward with sufficient downward velocity to avoid interference with the next following slice.

To enable the pulses of air to be timed precisely in relation to the linear travel of the slice 14, slice position in the preferred embodiment is detected by an optical sensor such as a photocell 30 disposed at a trigger point. In other embodiments, a mechanical switch or other means for sensing when a slice reaches the trigger point may be employed. The pulses of air are activated at a predetermined time interval after the slice is detected at the trigger point. This time interval is preferably determined by taking into account both the reaction time of the actuator and the time that will be required for the slice to travel from the trigger point to the location at which the pulses of air are to engage the slice. To improve the reliability of the apparatus, additional logic may be incorporated in the stacker control system to detect any slices that may adhere together. To avoid any interruption of stacking, the transfer bridge 20 may then be disabled with respect to these joined slices.

The preferred method and apparatus employ two conveyors 10 operating in parallel. Each conveyor 10 has two stacking locations 22 and 23.

In the preferred method and apparatus, each of the transfer bridges 20 and 21 is located a short distance upstream of a respective one of the stacking locations. The first transfer bridge 20 is pivotable about its upstream end 54 so as to be movable between an extended position, shown in solid lines in FIG. 1, in which it peels slices off of the belts to drop them into the first stacking location 22, and a retracted position, shown in broken lines in FIG. 1, in which it permits slices to pass to the second transfer bridge 21. The position of the first transfer bridge is controlled by a pneumatic cylinder 34 or other mechanism for toggling it between the extended and retracted positions. The second transfer bridge 21 is fixed in an extended position so that each slice that reaches the second transfer bridge is peeled from the belts and directed into the second stacking location 23.

The forward momentum of each slice carries it forward to a respective stacking location as it accelerates downward after being peeled from the belt by the transfer bridge.

At each stacking location, an energy absorbing plate or wall 36 made of a suitable plastic or other material stops the forward progress of the slices as they drop into place, and one or more additional walls or guides arrange and maintain the slices in a stack. The wall 36 absorbs energy from the slice impacts to prevent or reduce the damage to the slices. The number of slices or weight of the stack may be monitored as the slices drop into the stack, e.g., by a counter associated with the optical sensor 30, or by a scale disposed at the stacking location to support the stack. When the first transfer bridge has been in a particular position for a predetermined time interval, or when the number of slices or weight of the stack reaches a predetermined limit, the first transfer bridge is toggled to switch stacking locations.

The system is preferably controlled so that half stacks, i.e., stacks weighing about one-half of the weight of the full stack into which the slices are to be ultimately incorporated, are formed at each stacking location. Thus, the first transfer bridge is toggled each time a half stack 38 is formed at either stacking location. Each half stack is then removed from the stacking location and combined with another half stack from the other conveyor. The half stacks are carried by upper and lower transverse conveying mechanisms 40 and 42 that receive the output of the respective stacking locations.

In the preferred embodiment, a lug conveying system is used to remove the stacks from the stacking locations. The lug conveyor and the transfer bridges are preferably synchronized so that one stack is removed in one stacking location while the other stack is being formed in the other location. The full stack 44 is then carried to an overwrapping operation where a plastic film outer wrap is formed around the stack and sealed. In the preferred embodiment, the apparatus may attain an operating rate between approximately 100 and 2500 slices/minute. To improve efficiency and speed, the mechanical motions of the apparatus and the activation times of the fluid actuators are preferably parameterized in the control system to coordinate operation of the transfer bridges and fluid pulses.

Each of the vacuum conveyors 10 is pivotably supported on a frame at one end so that the entire module may be pivoted upward to clear jams or for maintenance. The pivotable mounting of the conveyors also facilitates adjustment of the gap between the infeed conveyor 50 and the vacuum conveyor.

The apparatus described herein enables a high speed stacking operation to be interposed as a direct link between innerwrapping and overwrapping equipment, receiving slices from parallel hot pack operations generating up to 2,500 slices per minute. The invention is not limited to the preferred embodiment described above, or to any particular embodiment. The invention is further described in the following claims.

What is claimed is:

1. A method of stacking slices of a food product in a form, fill and seal operation in a high speed commercial packaging line comprising:

provided a conveyor for supporting slices from above comprising at least one conveyor belt having a series of perforations therein;

providing a transfer bridge adjacent a stacking location for peeling slices from said belt;

conveying a series of slices by supporting them from above with said at least one conveyor belt; and mechanically peeling a plurality of slices from said belts at said first stacking location with a transfer bridge to form a stack;

wherein said transfer bridge is disabled with respect to any slice that adheres to another slice.

2. A method in accordance with claim 1 wherein said transfer bridge comprises a plurality of downwardly sloping surfaces disposed beside said belts.

3. A method in accordance with claim 2 wherein said at least one conveyor belt comprises a pair of belts, and wherein said transfer bridge is disposed at least partially between said pair of belts.

4. A method in accordance with claim 3 wherein said transfer bridge acts on each particular slice while a vacuum is also acting on said particular slice.

5. A method in accordance with claim 4 wherein said transfer bridge is disabled with respect to any slice that adheres to another slice.

6. A method in accordance with claim 4 further comprising controlling rotation of said slices and accelerating said slices downward by directing pulses of gas at selected locations on said slices at selected times.

7. A method in accordance with claim 6 wherein said gas is air.

8. A method in accordance with claim 7 wherein said pulses of air apply pressure to a trailing portion of said slice.

9. A method in accordance with claim 8 further comprising directing pulses of air at said slices as they are peeled from said conveyor belt, and wherein said pulses of air also apply pressure to a leading portion of said slice to aid in accelerating the slice downward, in addition to controlling rotation of the slice.

10. A method in accordance with claim 9 further comprising determining the position of each slice as it approaches the stacking location and wherein directing pulses of air at said slices is timed in response to determination of slice position.

11. A method in accordance with claim 10 wherein directing said pulses of air comprises pulsing air through a plurality of nozzles.

12. A method in accordance with claim 11 wherein the timed response of the mechanical motions of the apparatus and the timed response of the air pulses are coordinated to increase the accuracy and operating speed range of the apparatus.

13. A method of stacking slices in a form, fill and seal operation in a high speed commercial packaging line comprising:

providing a conveyor for supporting slices from above comprising at least one conveyor belt having perforations therein, a first transfer bridge adjacent a first stacking location, said first transfer bridge being movable between an operative position for peeling slices from said belt and an idle position, and a second transfer bridge downstream from said first transfer bridge adjacent a second stacking location;

conveying a series of slices by supporting them from above with said at least one conveyor belt;

mechanically peeling a plurality of said slices from said belts at said first stacking location to form a first stack by positioning said transfer bridge in operative position;

shifting said transfer bridge to said idle position; and mechanically peeling a plurality of said slices from said belts at said second stacking location with said second transfer bridge.

14. A method in accordance with claim 13 wherein each transfer bridge comprises a plurality of downwardly sloping surfaces disposed beside said belts.

15. A method in accordance with claim 14 wherein said at least one conveyor belt comprises a pair of belts, and wherein said transfer bridge is disposed at least partially between said pair of belts.

16. A method in accordance with claim 15 wherein said transfer bridge acts on each particular slice while a vacuum is also acting on said particular slice.

17. A method in accordance with claim 16 wherein said transfer bridge is disabled with respect to any slice that adheres to another slice.

18. A method in accordance with claim 17 further comprising application of fluid pressure to said slices by directing pulsed fluid at said slices through nozzles disposed beside said belts.

19. A method in accordance with claim 18 wherein said fluid is air.

20. A method in accordance with claim 19 wherein the timed response of the mechanical motions of the apparatus and the timed response of the air pulses are coordinated to increase the accuracy and operating speed range of the apparatus.

21. A method in accordance with claim 20 wherein said fluid applies pressure to a trailing portion of said slice.

22. A method in accordance with claim 21 wherein said fluid also applies pressure to a leading portion of said slice, and wherein greater pressure is applied to the trailing portion of said slice to counter the moment applied thereto by the transfer bridge.

23. A method in accordance with claim 22 further comprising determining the position of each slice as it approaches a stacking location and wherein directing pulsed fluid at said slices is timed in response to determination of slice position.

24. A method in accordance with claim 23 wherein said pulsed fluid is directed at each slice by a plurality of nozzles, with at least one of said nozzles being disposed between said pair of belts.

25. A method in accordance with claim 24 further comprising providing one or more additional conveyors, and combining stacks of slices from said first and second conveyors.

26. Apparatus for stacking slices of a food product at a stacking location in a form, fill and seal operation in a high speed commercial packaging line comprising:

a conveyor for supporting slices from above comprising at least one conveyor belt having a series of perforations therein;

a transfer bridge adjacent said stacking location for peeling slices from said belt;

means for conveying a series of slices by supporting them from above with said conveyor belts; and means for mechanically peeling a plurality of slices from said belts at said first stacking location with a transfer bridge to form a stack; and means for disabling said transfer bridge with respect to any slice that adheres to another slice.

27. A method of stacking slices of a food product in a form, fill and seal operation in a high speed commercial packaging line comprising:

providing a conveyor for supporting slices from above comprising at least one conveyor belt having a series of perforations therein;

providing a transfer bridge adjacent a stacking location for peeling slices from said belt;

conveying a series of slices by supporting them from above with said conveyor belts;

mechanically peeling a plurality of slices from said belts at said first stacking location with a transfer bridge to form a stack; and controlling rotation of said slices and accelerating said slices downward by directing pulses of gas at selected locations on said slices at selected times.

28. A method in accordance with claim 27 wherein said transfer bridge comprises a plurality of downwardly sloping surfaces disposed beside said belts.

29. A method in accordance with claim 27 wherein said at least one conveyor belt comprises a pair of belts, and wherein said transfer bridge is disposed at least partially between said pair of belts.

30. A method in accordance with claim 27 wherein said transfer bridge acts on each particular slice while a vacuum is also acting on said particular slice.

31. A method in accordance with claim 27 wherein said transfer bridge is disabled with respect to any slice that adheres to another slice.

32. A method in accordance with claim 27 wherein said gas is air.

33. A method in accordance with claim 32 wherein said pulses of air apply pressure to a trailing portion of said slice.

34. A method in accordance with claim 33 further comprising directing pulses of air at said slices as they are peeled from said conveyor belt, and wherein said pulses of air also apply pressure to a leading portion of said slice to aid in accelerating the slice downward, in addition to controlling rotation of the slice.

35. A method in accordance with claim 34 further comprising determining the position of each slice as it approaches the stacking location and wherein directing pulses of air at said slices is timed in response to determination of slice position.

36. A method in accordance with claim 35 wherein directing said pulses of air comprises pulsing air through a plurality of nozzles.

37. A method in accordance with claim 36 wherein the timed response of the mechanical motions of the apparatus and the timed response of the air pulses are-coordinated to increase the accuracy and operating speed range of the apparatus.

* * * * *